Patented May 5, 1936

2,039,390

UNITED STATES PATENT OFFICE 2,039,390

PREPARATION OF MONOALKYL-NAPHTHYLAMINES

Paul W. Carleton, Pennsgrove, and Edwin L. Mattison, Carneys Point, N. J., assignors to E. I. du Pont de Nemours & Company, Wilmington, Del., a corporation of Delaware No Drawing. Application March 23, 1934, Serial No. 717,076

7 Claims. (Cl. 260—128)

This invention relates to the preparation of monoalkyl-naphthylamines and more particularly to the preparation of monoalkyl-alpha-naphthylamine.

It is an object of this invention to provide an improved process for the preparation of monoalkyl-alpha-naphthylamine, whereby the same is obtained in high yield, with a minimum production of by-products. Other and further important objects of this invention will appear as the description proceeds.

The alkylation of alpha-naphthylamine as practiced in the art is complicated by the formation of by-product secondary and tertiary amines, and also by the fact that the reaction does not go to completion, leaving a considerable quantity of the original primary amine unchanged. The separation of the constituents of this mixture is difficult and adds to the cost of the final product. It is of decided advantage when such a reaction can be controlled so as to give a practically pure monoalkyl-naphthylamine, thus eliminating the necessity of separation and purification.

In Beilstein (4th edition, vol. XII, pp. 1221–1222) is described the formation of methyl-α-naphthylamine by passing methyl-chloride into α-naphthylamine heated to 150°–180° C. Ethyl-α-naphthylamine, according to the same authority, is prepared by allowing to stand for several hours or heating under reflux a mixture of α-naphthylamine and ethyl-bromide in alcohol. Diethyl-naphthylamine is formed by a process involving the use of water and caustic soda.

The first-mentioned process produces α,α-di-naphthylamine as a by-product. The second process is costly, and produces considerable quantities of diethyl-naphthylamine.

We have now found that monoalkyl-alpha-naphthylamine may be produced in exceptionally high yield and of sufficient purity to be applicable directly in technical processes, if one reacts α-naphthylamine with the corresponding alkyl-halide under carefully controlled conditions as more fully described below.

The conditions which we found favorable for the production of best yields are first of all, the absence of water or alcohol; secondly, the absence of caustic or other external acid binding agents; and thirdly, careful control of the temperature whereby to finish the reaction at a temperature not exceeding 155° C., and not below 140° C. It is also advisable to take test samples of the reaction mass from time to time to insure correct duration of the reaction at the preferred range of temperature.

The minimum temperature of 140° C. may be approached uniformly by heating the mass gradually but steadily up to that temperature. Or the mass may be held for a time at a lower temperature, say at about 130° C., so long as reaction continues, as is evidenced by the evolution of heat. Nevertheless, the finishing of the reaction at the prescribed range of temperature, that is, at about 140° to 150° C., but in no case above 155° C., appears to be a very essential factor in this process, as otherwise the high yields and purity of the desired product are not obtainable.

Our invention is applicable to the manufacture of various alkyl derivatives, such as methyl, ethyl, propyl, etc., of either α- or β-naphthylamine, but will be illustrated particularly in the following example by specific application to α-ethyl-naphthylamine. Parts mentioned are by weight.

*Example*

1072 parts of alpha-naphthylamine and 508 parts of ethyl chloride are charged into a cold autoclave, fitted with a device for releasing the pressure. The mixture is rapidly heated to 90° C. and then slowly heated to 145° C. at which temperature the charge is stirred for 5 hours. The charge is then cooled, the pressure released, and the mass removed from the autoclave as a solid. Practically pure mono-ethyl-alpha-naphthylamine hydrochloride is obtained. In order to isolate the free base the charge is slurried with 1 liter of water and the mixture heated while 700 parts of 30% caustic soda is added (i. e., sufficient to produce permanent alkalinity). The free base separates as an oil, and is removed, washed and distilled under diminished pressure. The product thus obtained is mono-ethyl-alpha-naphthylamine of a high degree of purity, and contains less than 1% of alpha-naphthylamine. If desired, the charge can be removed from the autoclave by an alternative method. After cooling to 100° C. the pressure is released and mono-ethyl-alpha-naphthylamine added. The resulting liquid mixture is then blown out of the autoclave by pressure into water, treated with caustic solution, and further worked up as described above.

It will be understood that while we have indicated above specific conditions of operation and proportions of materials for the purpose of illustration, our invention is not limited thereby. For example, the proportion of ethyl chloride may be increased somewhat, say up to 10% excess, without seriously affecting the yield. The range of temperature may vary between 140 and 155°

C. The time can also be extended or somewhat shortened. For best results, the correct duration of the heating should be controlled by taking test samples and analyzing them for the presence or proportion of by-products. As a rule, 2 to 6 hours of heating produces good results.

Inert organic diluents, for instance, hydrocarbons such as xylene, may be added to the reaction mass if desired.

Many other variations and modifications are possible in our preferred mode of procedure, without departing from the spirit of this invention.

In the claims below the term "lower alkyl" should be understood as limited to an alkyl chain containing not over 5 carbon atoms. Also, the term "substantially dry" is intended to refer to $\alpha$-naphthylamine as it generally occurs in commerce. This commercial product is not absolutely dry, but frequently bears the specification "moisture content, less than 1%". Upon standing, it may absorb moisture from the atmosphere to a slight extent, probably up to 1.5%. The term "substantially dry" in the claims below is therefore employed to designate $\alpha$-naphthylamine with a moisture content not greater than the natural content from the causes aforementioned.

We claim:

1. A process for producing a monoalkyl-naphthylamine, which comprises heating together, in the absence of water, alcohol or extraneous acid binding agents, a naphthylamine and a lower alkyl-halide at a temperature not exceeding 155° C., and finishing the reaction at a temperature between 140 and 155° C.

2. A process for producing a monoalkyl-$\alpha$-naphthylamine, which comprises heating together substantially dry $\alpha$-naphthylamine and a lower alkyl halide in a closed vessel and at a temperature not exceeding 155° C., and finishing the reaction at a temperature between 140 and 155° C.

3. A process for producing monoethyl-$\alpha$-naphthylamine, which comprises heating together substantially dry $\alpha$-naphthylamine and ethyl chloride in a closed vessel and at a temperature not exceeding 155° C., and finishing the reaction at a temperature between 140 and 155° C.

4. A process for producing monoethyl-$\alpha$-naphthylamine, which comprises heating together in a closed vessel about 1072 parts of $\alpha$-naphthylamine, and about 508 parts of ethyl chloride until a temperature of about 90° C. is reached; continuing the heating slowly until a temperature of about 145° C., and stirring the mass at this temperature for about 2 to about 6 hours.

5. A process as in claim 4, the reaction product being recovered in the form of its hydrochloride.

6. A process as in claim 4, the reaction product being recovered in the form of its hydrochloride and then treated with alkali to convert it into the free base.

7. A process for producing monoethyl-$\alpha$-naphthylamine which comprises heating slowly a mixture of $\alpha$-naphthylamine with not over 10% excess of the theoretical quantity of ethyl chloride, in a closed vessel, to a temperature of about 140° C. to about 150° C., and finishing the reaction at a temperature not exceeding 150° C.

PAUL W. CARLETON.
EDWIN L. MATTISON.